United States Patent Office 3,264,322
Patented August 2, 1966

3,264,322
NOVEL HALOGENATED KETONIDES
Daniel Bertin, Montrouge, and Jacques Perronnet, Paris, France, assignors to Roussel-Uclaf, S.A., Paris, France, a corporation of France
No Drawing. Filed Apr. 11, 1963, Ser. No. 272,230
Claims priority, application France, Apr. 18, 1962, 894,924
6 Claims. (Cl. 260—340.9)

The invention relates to novel halogenated ketonides having the formula $$X-CH_2-CH_2-CH-CH_2 \atop \underset{\underset{R_1 \quad R_2}{C}}{O \quad O} \qquad I$$

wherein X is a halogen and $R_1$ and $R_2$ are alkyl radicals having 1 to 10 carbon atoms. The invention also relates to a novel process for the preparation of the said halogenated ketonides and to novel intermediates formed therein.

Known processes for the preparation of steroid lactones from 17-keto steroids involved the preparation of 17-ethynyl derivatives of the 17-keto steroids which must then be reduced by catalytic hydrogenation. These processes are unsatisfactory since the catalytic hydrogenation frequently affected other portions of the steroid which could be reduced under the hydrogenation conditions. The ketonides of Formula I are useful for the preparation of lactones of steroids which does not require a reduction step.

It is an object of the invention to provide novel halogenated ketonides of Formula I.

It is another object of the invention to provide a novel process for the preparation of halogenated ketonides of Formula I.

It is a further object of the invention to provide novel intermediates for halogenated ketonides of Formula I.

These and other objects and advantages of the invention will become obvious from the following detailed description.

The novel halogenated ketonides of the invention have the formula $$X-(CH_2)_2-CH-CH_2 \atop \underset{\underset{R_1 \quad R_2}{C}}{O \quad O} \qquad I$$

wherein X is a halogen and $R_1$ and $R_2$ are alkyl radicals having 1 to 10 carbon atoms. Iodine, bromine and chlorine are the preferred halogens.

The novel process of the invention for the halogenated ketonides of Formula I comprises reacting 1,2,4-trihydroxy-butane with an aliphatic ketone having the formula $$R_1-\overset{O}{\overset{\|}{C}}-R_2$$

wherein $R_1$ and $R_2$ have the above definitions in the presence of an acid catalyst to form the corresponding 1,2-ketonide of 1,2,4-trihydroxy-butane, reacting the latter with an esterification agent of an organic sulfonic acid in the presence of a tertiary amine to form the corresponding ester of the 1,2-ketonide of 1,2,4-trihydroxy-butane and reacting the latter with an alkali metal halide to form the halogenated ketonide of Formula I.

Examples of suitable aliphatic ketones which can be reacted with 1,2,4-trihydroxy-butane are acetone, diethyl ketone, methyl ethyl ketone, methyl isopropyl ketone, diisopropyl ketone, β-methyl pentane-2-one, tert.-butyl methyl ketone, etc.

Examples of suitable acid catalysts for the reaction of the ketone with 1,2,4-trihydroxy-butane are inorganic acids, such as perchloric acid, hydrochloric acid, sulfuric acid, phosphoric acid, etc. and organic acids, such as p-toluene sulfonic acid, etc.

The esterification of the 4-hydroxy group of the ketonide of 1,2,4-trihydroxy-butane may be effected with a derivative of an organic sulfonic acid, such as the acid halide or the acid anhydride. Examples of suitable organic sulfonic acids are aliphatic sulfonic acids, such as methyl sulfonic acid, n-propyl sulfonic acid, isopropyl sulfonic acid, tert.-butyl sulfonic acid and other lower alkyl sulfonic acids and aryl sulfonic acids, such as p-toluene sulfonic acids, benzene sulfonic acid, etc.

The esterification of the 4-hydroxy group of the said ketonide is effected in the presence of a tertiary amine and an inert organic solvent if desired. Examples of suitable tertiary amines are aliphatic amines, such as trimethyl amine, triethyl amine, tripropyl amine, etc., aromatic amines such as dimethyl aniline, diethyl aniline, etc. and heterocyclic amines, such as pyridine, collidine, nicotine, N-methyl morpholine, N-ethyl morpholine, α,γ-lutidine, etc.

The halogenation of the ester in the 4-position of the said ketonide is effected with an alkali metal halide, such as lithium bromide, sodium iodide, sodium bromide, sodium chloride, potassium iodide, potassium bromide, etc. in an inert organic solvent, such as acetone, methyl ethyl ketone, methyl isobutyl ketone, diethyl ketone, etc.

A preferred mode of the process of the invention comprises reacting 1,2,4-trihydroxy-butane with acetone in the presence of perchloric acid to form 1,2-isopropylidene-dioxy-4-hydroxy-butane, reacting the latter with methyl sulfonic acid chloride in the presence of pyridine to form the 4-methyl sulfonic acid ester of 1,2-isopropylidene-dioxy-4-hydroxy-butane and reacting the latter with lithium bromide in acetone to form 1,2-isopropylidine-dioxy-4-bromo-butane. The reaction scheme is illustrated in Table I.

TABLE I $$HO-CH_2-CH_2-CH-CH_2 \atop \underset{OH \quad OH}{} \longrightarrow HO-CH_2-CH_2-CH-CH_2 \atop \underset{\underset{R_1 \quad R_2}{C}}{O \quad O}$$

$$\downarrow$$

$$R_3O-CH_2-CH_2-CH-CH_2 \atop \underset{\underset{R_1 \quad R_2}{C}}{O \quad O} \longrightarrow X-CH_2-CH_2-CH-CH \atop \underset{\underset{R_1 \quad R_2}{C}}{O \quad O}$$

wherein $R_1$ and $R_2$ are alkyl radicals having 1 to 10 carbon atoms, $R_3$ is an acyl radical of an organic sulfonic acid and X is a halogen.

The novel halogenated ketonides of Formula I can be reacted with 16-keto or 17-keto steroids to form the corresponding lactone thereof without a catalytic hydrogenation which can cause reduction in other portions of the steroid molecule. The steroid lactones can be prepared by forming the magnesium derivatives of the halogenated ketonide of Formula I, condensing the latter with a 17-keto or 16-keto steroid by a Grignard reaction to form the corresponding carbinol in which the alcohol functions are blocked, hydrolyzing the latter to free the blocked alcohol groups, degrading the lateral chain of the latter with simultaneous cyclization to form a cyclic hemiketal, forming a diether of the latter and oxidizing the latter to the corresponding lactone. The reaction scheme is illustrated in Table II and the formation of specific lactones are disclosed in copending applications Serial No. 272,224 and Serial No. 272,244, filed on even date thereof.

TABLE II

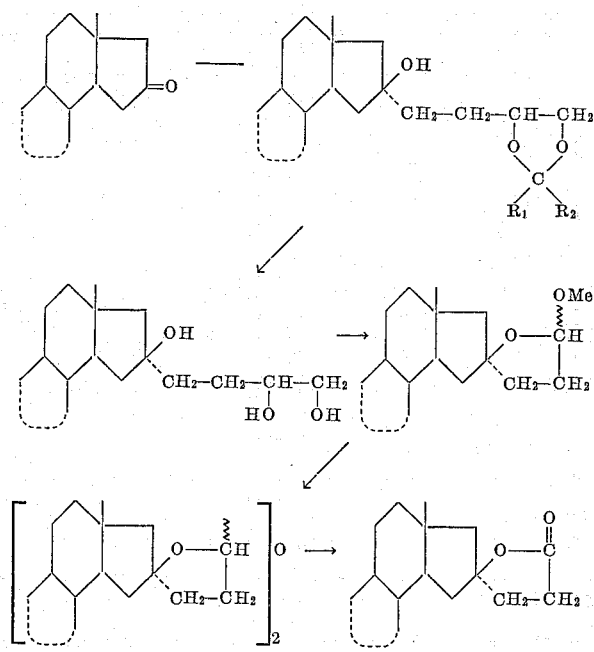

wherein $R_1$ and $R_2$ have the above definition and Me is a methyl group.

If the 17-keto or 16-keto steroids possess other carbonyl groups capable of reacting with the halogenated ketonide of Formula I, the said carbonyl groups should be protected by formation of enamines for example.

In the following example there are described several preferred embodiments to illustrate the invention. However, it should be understood that the invention is not intended to be limited to the specific embodiments.

*Example*

PREPARATION OF 1,2-ISOPROPYLIDENE-DIOXY-4-BROMO-BUTANE

*Step A: Preparation of 1,2-isopropylidene-dioxy-4-hydroxy-butane.*—A reaction mixture of 250 gm. of 1,2,4-trihydroxy-butane, 3000 cc. of acetone and 25 cc. of 65% perchloric acid was prepared. The mixture was allowed to stand at room temperature under an atmosphere of nitrogen and under agitation for a period of about 2 hours. Then 65 gm. of sodium carbonate were added and the agitation was continued for a period of one hour. The reaction mixture was filtered and 1.5 cc. of triethylamine were added to the filtrate. The acetone was then removed under slight vacuum and the mixture was rectified under a vacuum of 20 mm. 252 gm. of a fraction distilling under vacuum of 20 mm. at 107–109° C. were recovered which was 1,2-isopropylidene-dioxy-4-hydroxy-butane whose boiling point at 760 mm. was 207° C., and whose index of refraction was $n_D^{20}=1.439$.

The product was soluble in alcohol and acetone, insoluble in water and dilute aqueous alkalis and dilute aqueous acids decomposed it.

This compound is not described in the literature.

*Step B: Preparation of the methyl sulfonic acid ester of 1,2-isopropylidene-dioxy-4-hydroxy-butane.*—100 gm. of 1,2-isopropylidene-dioxy-4-hydroxy-butane were dissolved in 125 cc. of pyridine. The solution was cooled to −40° C. and slowly 54 cc. of methyl sulfonic acid chloride were introduced. Then the temperature was allowed to rise to between −10° and −5° C. and the reaction mixture was agitated for a period of 2 hours. The temperature of the mixture was then allowed to rise to room temperature and the mixture was then added to water. The aqueous solution was extracted with ether. The extracts were washed successively with a solution of sodium bicarbonate, a normal solution of sodium hydroxide and then stood overnight with agitation with a solution of sodium bicarbonate in the presence of triethylamine. Next the extract was washed with salt-saturated water, dried over magnesium sulfate and concentrated under nitrogen. 140 gm. of a liquid were obtained which was the raw methyl sulfonic acid ester of 1,2-isopropylidene-dioxy-4-hydroxy-butane.

The product was soluble in chloroform, insoluble in water and dilute aqueous alkalis and dilute aqueous acids decomposed it.

This compound is not described in the literature.

By reacting 1,2-isopropylidene-dioxy-4-hydroxy-butane with acetic acid anhydride in the presence of pyridine, the acetate of 1,2-isopropylidene-dioxy-4-hydroxy-butane, having a boiling point of 205° C. at 760 mm. Hg and an index of refraction $n_D^{20}=1.430$ was obtained.

This product was soluble in chloroform, slightly soluble in ether and insoluble in water and dilute aqueous alkalis while dilute aqueous acids decomposed it.

This compound is not described in the literature.

*Step C: Preparation of 1,2-isopropylidene-dioxy-4-bromo-butane.*—280 gm. of lithium bromide were introduced into 1,400 cc. of acetone. Then 140 gm. of the methyl sulfonic acid ester of 1,2-isopropylidene-dioxy-4-hydroxy-butane and 7.5 cc. of triethylamine were added. The reaction mixture was heated to reflux under agitation for a period of about five hours and then 1,500 cc. of water were added. The organic phase was separated and the aqueous acetonic phase was extracted with ether. The ethereal extract was dried and concentrated under nitrogen. The residue of the ethereal extract was added to the organic phase and the solution was allowed to stand with potassium carbonate in the presence of triethylamine. Next the solution was filtered, distilled under vacuum and 55 gm. of 1,2-isopropylidene-dioxy-4-bromo-butane having a boiling point (under 18–19 mm. Hg) of 89–90° C. and an index of refraction $n_D^{22}=1.462$ were obtained.

The product was soluble in acetone and chloroform, insoluble in water and dilute aqueous alkalis while dilute aqueous acids decomposed it.

*Analysis.* — $C_7H_{13}O_2Br$; molecular weight=209.09. Calculated: C, 40.20%; H, 6.26%; Br, 38.22%. Found: C, 40.3%; H, 6.1%; Br, 37.9.

This compound is not described in the literature.

1,2-isopropylidene-dioxy-4-bromo-butane can be hydrolyzed in the presence of an acid, such as hydrochloric acid to form 1,2-dihydroxy-4-bromo-butane having an index of refraction $n_D^{26}=1.475$. The said product which is soluble in chloroform, alcohol and water is not described in the literature.

Other ketonides of 1,2-dihydroxy-4-bromo or 4-iodo-butane can be prepared by replacing acetone in Step A with the desired ketone, such as diethyl ketone, methyl tert.-butyl ketone, etc.

Various modifications of the process of the invention may be made without departing from the spirit or scope thereof and it is to be understood that the invention is to be limited only as defined in the appended claims.

We claim:

1. A compound having the formula

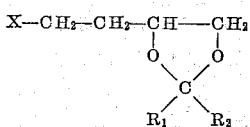

wherein $R_1$ and $R_2$ are alkyl radicals having 1 to 10 carbon atoms and X is a halogen.

2. 1,2-isopropylidene-dioxy-4-bromo-butane.

3. A process for the preparation of halogenated ketonides of the formula

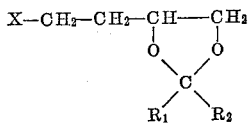

wherein $R_1$ and $R_2$ are alkyl radicals having 1 to 10 carbon atoms and X is a halogen which comprises reacting a sulfonic acid ester of the formula

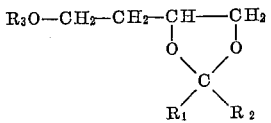

wherein $R_1$ and $R_2$ have the above definition and $R_3$ is the acyl radical of a sulfonic acid selected from the group consisting of lower alkyl sulfonic acids, benzene sulfonic acid and lower alkyl benzene sulfonic acids with an alkali metal halide in an inert organic solvent in the presence of a tertiary amine to form the corresponding halogenated ketonide.

4. The process of claim 3 wherein the alkali metal halide is lithium bromide.

5. A process for the preparation of 1,2-isopropylidene-dioxy-4-bromo butane which comprises reacting the methyl sulfonic acid ester of 1,2-isopropylidene-dioxy-4-hydroxy butane with an alkali metal bromide in an inert organic solvent in the presence of a tertiary amine to form 1,2-isopropylidene-dioxy-4-bromo-butane.

6. The process of claim 5 wherein the alkali metal bromide is lithium bromide.

References Cited by the Examiner

UNITED STATES PATENTS

| | | | |
|---|---|---|---|
| 2,606,908 | 8/1952 | Blicke | 360—340.9 |
| 2,691,026 | 10/1954 | Harvey | 260—340.9 |
| 2,730,529 | 1/1956 | Gatzi et al. | 260—340.9 |
| 2,993,055 | 7/1961 | Hennis et al. | 260—340.9 |
| 3,022,356 | 2/1962 | Ver Nooy | 260—633 |
| 3,037,059 | 5/1962 | Kaiser | 260—633 |

OTHER REFERENCES

Foster et al.: Tetrahedron, vol. 16, pp. 177–84 (1961).

Houben-Weyl: Methoden der Organischem Chemie, 4th ed., vol. V/4 (1960), pp. 412–13.

WALTER A. MODANCE, *Primary Examiner.*

NICHOLAS S. RIZZO, *Examiner.*

DON M. KERR, NORMA S. MILESTONE,
*Assistant Examiners.*